No. 847,571. PATENTED MAR. 19, 1907.
J. R. GRICE & O. E. PIDCOCK.
CALF WEANER.
APPLICATION FILED MAR. 29, 1904.

WITNESSES:
F. G. Larson
Mita Sands

INVENTORS
John R. Grice
Orie E. Pidcock
By Geo. W. Jues Attorney

UNITED STATES PATENT OFFICE.

JOHN R. GRICE AND ORIE E. PIDCOCK, OF DEUEL, COLORADO.

CALF-WEANER.

No. 847,571.      Specification of Letters Patent.      Patented March 19, 1907.

Application filed March 29, 1904. Serial No. 200,623.

*To all whom it may concern:*

Be it known that we, JOHN R. GRICE and ORIE E. PIDCOCK, both residing at Deuel, in the county of Morgan and State of Colorado, have invented certain useful Improvements in Calf-Weaners; and we do hereby declare that the following is a full, clear, and exact description thereof, such as will enable others skilled in the art to which it appertains to make and use the same, reference being had to the accompanying drawings, which form a part of this specification.

This invention relates to a new and useful improvement in calf-weaners.

The object of our invention is to provide a neat and simple device adapted to be detachably secured to a calf to provide a shield preventing the calf from suckling, but allowing the same to graze.

Figure 1:
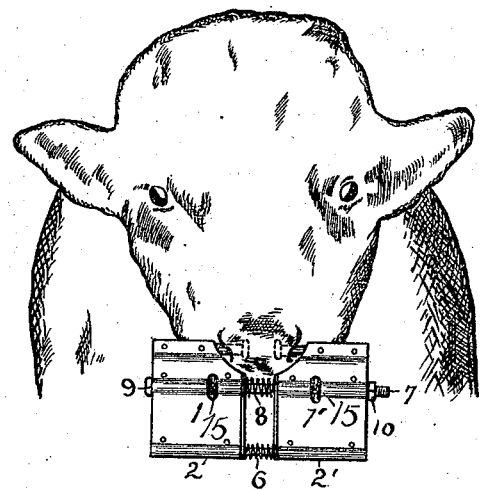
Figure 2:
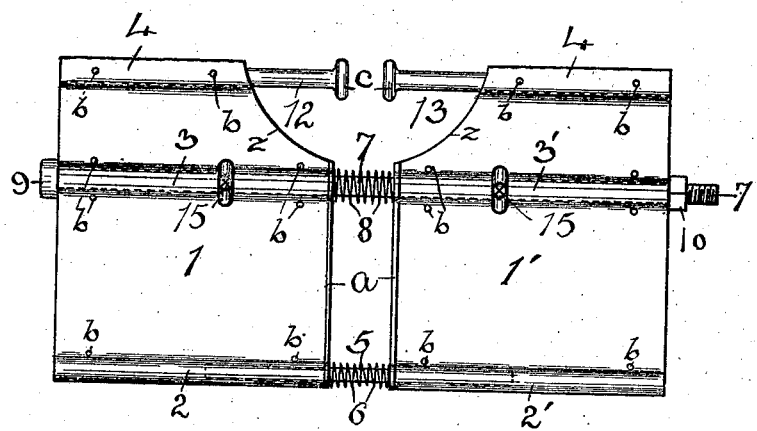
Figure 3:
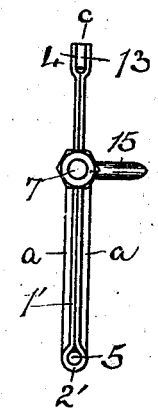

In the accompanying drawings we have shown in Figure 1 a sketch of a calf-weaner as adjusted to a calf. Fig. 2 shows an enlarged detailed view thereof, while Fig. 3 shows an end view.

In carrying out the aim of our invention we use two pieces of sheet metal 1 and 1', which are identical in construction, and bend them double to provide below a tubular portion or socket, (marked 2 and 2' in the drawings.) Near the opposite ends the folded sheet-metal members are again bent to form the intermediate socket portions 3 and 3', while near the upper end of each member 1 and 1', (marked 4 and 4', respectively,) is secured to the rectangular stem of the nose-pins 12 and 13, provided with the terminal buttons c, as is disclosed in Fig. 2.

By means of suitable rivets b the members 1 and 1' are secured to their respective nose-pins. Below and secured within the socket member 2 is a pin 5, while this pin loosely works backward and forward within the socket member 2'.

Loosely extending through the sockets 3 and 3' is the bolt 7, provided with the head 9 and the nut 10, as clearly shown in Fig. 2.

The members 1 and 1' are cut away above, as is shown at z, adjacent the nose-pins, while the inner edges of these members 1 and 1' are turned laterally outward, as is shown at a in Figs. 2 and 3.

Interposed between the counterpart members 1 and 1' and surrounding the pin 5 and the bolt 7 are the coil-springs 6 and 8, which have a tendency to normally force these members 1 and 1' apart, so that these members are held together adjustably by means of the nut 10, against which the member 1' presses, while the member 1 by virtue of the springs 6 and 8 is forced against the head 9, as clearly shown.

Now in using this calf-weaner the nut 10 is so adjusted that the nose-pins 12 and 13 are carried far enough apart to permit the buttons c to be nicely adjusted within the nose of the calf, the nut 10 then being screwed forward to hold the same in proper adjustment, so that these buttons are held together only tight enough so that the calf-weaner may be conveniently carried by the animal.

The device is quite light and simple of construction, and having thus described our said invention, what we claim as new, and desire to secure by United States Letters Patent, is—

1. A calf-weaner comprising two members, in combination with a threaded stem uniting said members, a nut upon said threaded stem, a spring interposed between said members, and button-provided pins extending from said members.

2. A calf-weaner comprising the combination of two counterpart members, each member being provided along one edge with a socket, in combination with a stem working within said sockets, an intermediate socket within each of said members, a threaded stem passing through said intermediate sockets, a nut upon said threaded stem, springs interposed between said members, and button-provided nose-pins extending from said members, all arranged substantially as and for the purpose set forth.

In testimony whereof we affix our signatures in presence of two witnesses.

JOHN R. GRICE.
                ORIE E. PIDCOCK.

Witnesses:
    CASPAR GIGER,
    JOSEPH F. BOESCH.